F. S. WEISE.
TIRE FOR VEHICLE WHEELS.
APPLICATION FILED AUG. 17, 1915.
1,194,797.
Patented Aug. 15, 1916.
2 SHEETS—SHEET 2.
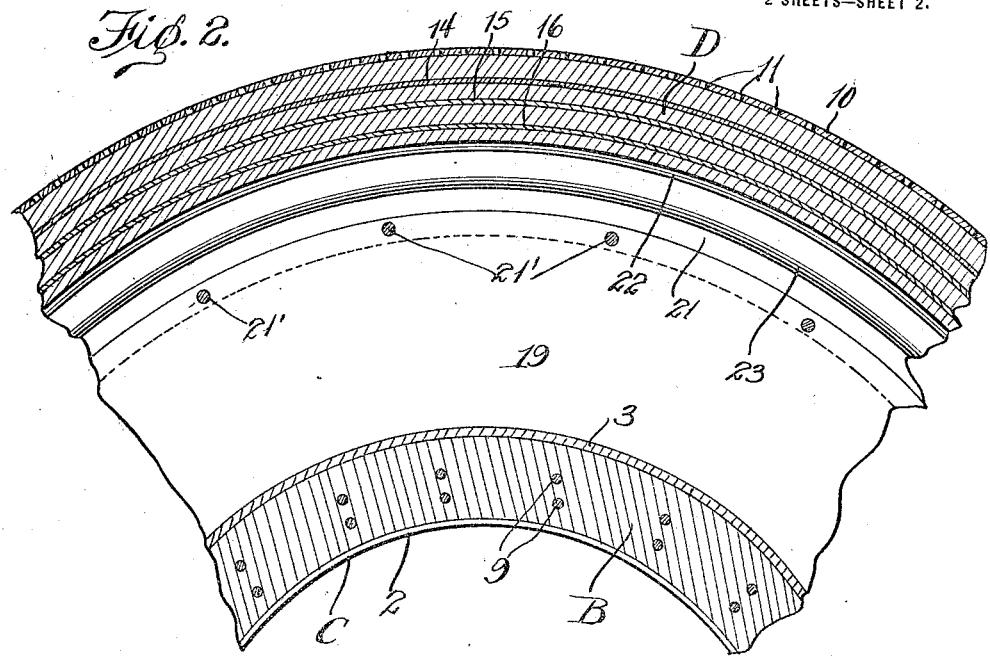
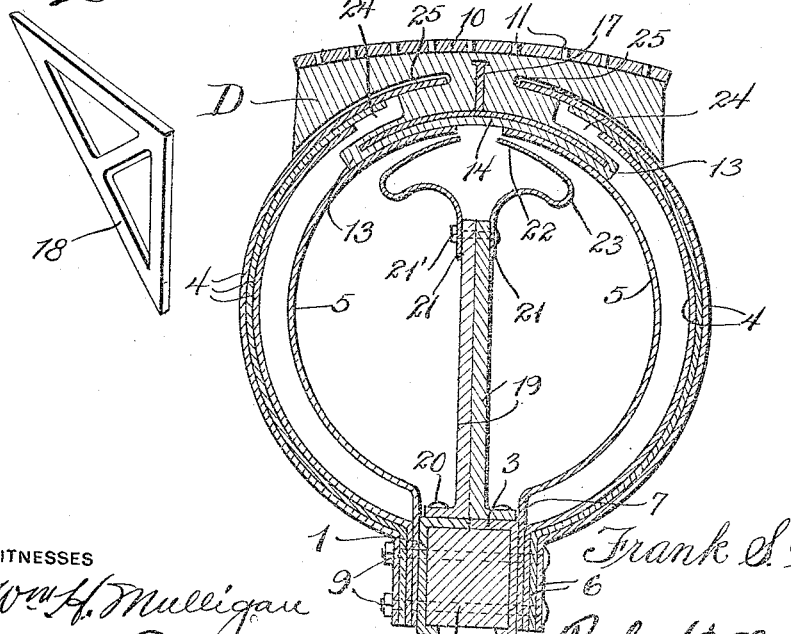
WITNESSES
INVENTOR
Frank S. Weise
BY
ATTORNEY

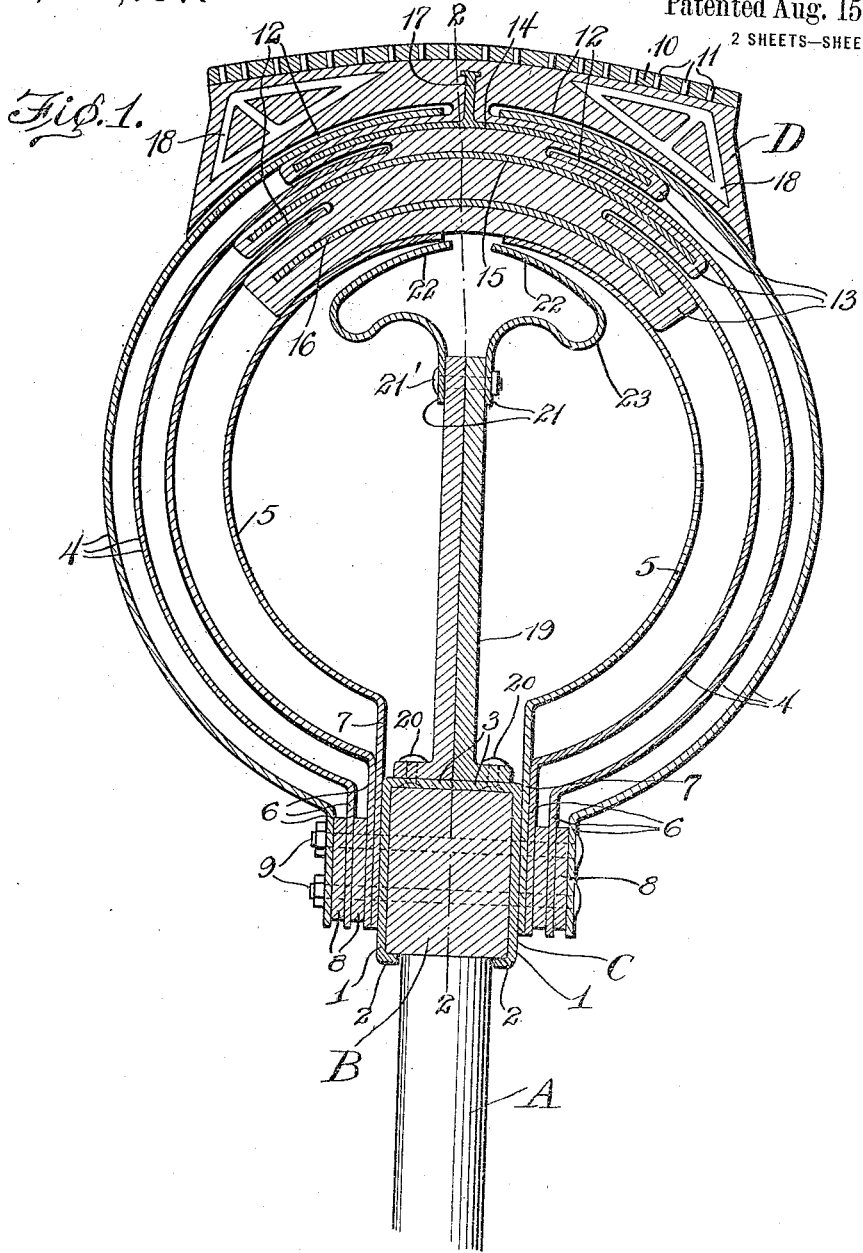

UNITED STATES PATENT OFFICE.

FRANK S. WEISE, OF BALTIMORE, MARYLAND.

TIRE FOR VEHICLE-WHEELS.

1,194,797. Specification of Letters Patent. Patented Aug. 15, 1916.

Application filed August 17, 1915. Serial No. 45,971.

*To all whom it may concern:*

Be it known that I, FRANK S. WEISE, a citizen of the United States, residing at Baltimore, in the State of Maryland, have invented certain new and useful Improvements in Tires for Vehicle-Wheels, of which the following is a specification.

My invention relates to a tire for vehicle wheels and has as its general aim the provision of a novel and efficient structure to supplant the pneumatic tire in order to overcome the usual objections thereto, especially liability to punctures and blowouts, excessive wear and cost of manufacture and maintenance, to increase the safety of passengers, while possessing the same advantages as the pneumatic tire.

In carrying out said general aim, an object is to provide a tire structure having a suitable tread supported by a novel form of durable and effective metallic cushioning means.

The second object is to provide a tread adapted to receive and mount the outer extremities of its cushioning means and the latter being fastened to a wheel structure.

A third object is to provide means inclosed by the said cushioning elements to coöperate with said elements in yieldingly supporting the said tread.

Further I aim to generally simplify and render more practical, tires having metallic cushioning means, and in addition aim to accomplish additional and servient objects which will hereinafter appear from the description of the invention following taken in connection with the accompanying drawings wherein:—

Figure 1 is a transverse section through my improved tire in connection with a wheel felly and spokes leading therefrom; Fig. 2 is a fragmentary longitudinal sectional view taken on the line 2—2 of Fig. 1, Fig. 3 is a transverse sectional view through a modified form of tire structure embodying my invention as well as parts of a wheel to which the tire is attached, and Fig. 4 is a perspective view of one of the stay members of the type which may be embedded in the tire shoe or tread.

Referring specifically to the drawings wherein like reference numerals designate like or similar parts in the several views and first to the form shown in Figs. 1 and 2, parts of a wheel are shown by way of example, A designating a spoke and B the felly from which it radiates. The improved tire is adapted to be detachably connected with the felly and which it may be stated may be of any suitable construction in view of which fact the one shown at B is to be understood as being by way of example only. In some instances it may be desired to reinforce the felly B to prevent weakening and injury thereof and also to accommodate the felly to different forms and sizes of tires. Therefore one form of means to accomplish this end has been shown in the nature of annular channel members C having portions 1 to rest against the sides of the felly and flanges 2 and 3 disposed at an angle to portion 1 to overlap the inner and outer peripheral walls of the felly respectively.

The main cushioning means for the tire is connected to and supported from the felly B and may consist of a suitable number of cushioning springs 4 and 5 which may be made from any suitable flexible resilient material, for instance spring steel. These springs while they may be of any suitable form are preferably substantially in the form of annular half tubes since they are annular and curved or bowed outwardly from the circumferential center of the tire. Extending radially from the springs 4 and 5 toward the wheel hub are annular tang flanges 6 and 7. Said flanges 7 directly abut the portions 1 of channel members C and in turn the innermost flanges 6 abut said flanges 7. Intermediate the central flanges 6 and the flanges 6 on each side thereof and on opposite sides of wheel are disposed annular spacing plates or rings 8. These plates 8 serve to maintain the springs 4 in spaced relation so that the full resiliency thereof may be utilized. These springs 4 are also spaced from each other at the bowed portions and from the spring 5 for the same purpose. Detachable bolts 9 pass through the tangs 6 and 7, plates 8, channels C and felly B in order to detachably connect the tire and the wheel. This manner of mounting the tire is to be understood as being by way of example only.

A tread or shoe generally designated D is supported by the cushioning springs 4 and 5 which is of any suitable construction. For instance it may be made primarily of rubber, rubber composition or any yielding medium. The outer skin or tread is shown at 10 and therein may be embedded if desired suitable wear resisting studs 11 of metal or other suitable material. The shoe is also provided with any suitable number of annular inwardly extending grooves 12 into which the outer edges of springs 4 project and are disposed. These grooves are defined through the provision of annular flanges 13 of the shoe. In order to better support the outer edges of the said springs 4 and afford more resiliency, rings 14, 15 and 16, which are arcuate in cross section, are embedded in the shoe and each of which extends into the flanges 13 so as to overlap said springs 4. These rings 14, 15 and 16 are of resilient metal and preferably of the same material as springs 4 and 5, that is spring steel. To reinforce the tread at its center, a radial flange 17 integral with ring 14, extends toward the skin 10. Flange 17 forms a means to initially receive the pressure on the tire in operation and as a means to impart such pressure to the different cushioning springs within the two outermost springs 4. This action flattens the tread to some extent and also the rings 14, 15 and 16, and causes the inner portion of the tread to bear against the outermost springs 4 and force them against the portion of the shoe opposite the stay members 18 and which stay members prevent undue spreading of the shoe. Were the tread D not reinforced adjacent its sides, it would not remain in effective coöperating relation with the cushioning springs and for this reason suitable stay members 18 of any preferred cross sectional form are embedded in the shoe adjacent said side edges. It may be mentioned that the members 18 may be made of any suitable material to increase the rigidity of the tread shoe along its side edges. This construction prevents disengagement of the cushioning springs from their grooves when the tire is assembled as will be realized. Springs 5 bear against the inner periphery of the tread and terminate short of each other. A strut cushioning means may also be employed and to this end plates 19 are disposed in abutting relation and extend interiorly of the tire, being secured to the flanges 3 as by means of rivets or the equivalent at 20. Bolts 21' fasten the plates 19 together at their outer edges and also fasten to the plates against the outer faces thereof, a plurality of annular springs 21 which have free inwardly movable portions 22. The springs 21 are preferably made of resilient material like the springs 4 and 5 and have their resiliency increased by the provision of loops at 23.

To assemble the tire on a wheel, the cushion springs 4 and 5 are first built up in assembled relation only on one side of the felly B, after having suitably arranged the plates 19 and cushioning elements 21 on the periphery of said felly. The tread, with its complemental resilient elements 13, is then inserted in place with respect to the built up side; then the other side of the tire is similarly built up, the tread being capable of sufficient distortion to permit this sectional building up of the entire tire. In building up the tire the tread may, if found desirable, be cemented or otherwise held in place relative to the cushion springs 4 and 5.

The tire of course may be applied to vehicle wheels generally since the construction is not such as to limit their use to any special type.

In use, as the tread encounters obstructions in the path of travel or uneven road surfaces, the wheel proper will move relatively to the tread with the cushioning springs 4 and 5 consequently yielding so as to move the central portions of the bows of springs 4 and 5 outwardly on opposite sides of and from the strut plates 19. The outer edges of the springs 4 and 5 are reinforced and their resilient action rendered more effective by the provision of the rings 15 and 16. The cushioning of the tread is further increased by the spring elements 22 against which the inner edges of spring 5 and the inner periphery of the shoe abut.

Since the foregoing illustrates merely one embodiment of the invention, it is to be understood that changes in the details of construction may be resorted to within the spirit and scope of the invention as defined by appended claims. For instance the modified form shown in Fig. 3 may be used. The construction in Fig. 3 differs somewhat from that illustrated in the other figures but since many of the parts are identical with those of the other figures, the same reference numerals have been applied thereto. The two constructions differ in the following particulars: A single flange 13 is provided and therein the reinforcing resilient ring 14 is embedded. Beyond this flange enlarged annular inwardly extending grooves 24 are provided to receive the outer edges of one or a plurality of the springs 4 which are laminated or in contiguous relation and which grooves communicate with second inwardly extending grooves 25 receiving the outer edges of the outermost springs 4.

Having thus described my said invention, what I claim and desire to secure by Letters Patent is:—

1. A vehicle tire having a tread, a plurality of half tubular members spaced apart at their inner peripheries and forming cushioning devices therefor, said devices being disposed on different sides of the tread, said tread having grooves, one on each of said sides thereof for receiving said cushioning devices and effecting the mounting of the tread as well as the cushioning thereof, and common means for fastening said devices together and connecting the tire to a wheel.

2. In combination with a wheel, a tire therefor having a tread, cushioning means for the tread separable from the wheel and attachable to the wheel to surround its periphery, cushioning elements within said cushioning means, means mounting said cushioning means, strut means detachable from the wheel mounted from the last mentioned means, and cushioning means for the tread mounted on said strut means intermediate said elements.

3. A vehicle tire having a tread, oppositely disposed cushioning elements therefor, said tread overlapping said elements, and a metallic ring embedded in said tread surrounding said elements on the exterior thereof.

4. A vehicle tire having a tread, cushioning elements therefor, said tread having grooves receiving said elements, second cushioning elements, flanges on said tread disposed intermediate the first and second mentioned cushioning elements, resilient reinforcing means coöperating with said second mentioned cushioning means and common to said flanges, and reinforcing means extending from said reinforcing means and intermediate the first mentioned cushioning elements.

5. A vehicle tire having a tread, cushioning means therefor, cushioning elements additional to said means intermediate said means on which the inner face of the tread rests, and strut cushioning means for the tread intermediate said cushioning elements.

6. A vehicle tire having a tread, a plurality of cushioning elements on opposite sides of the felly for said tread, and spacing elements intermediate said cushioning elements adjacent the fastening edges to permit the maximum degree of resiliency being given.

7. A vehicle tire having a tread, said tread being provided with grooves, cushioning elements extending into said grooves, said elements having tang flanges, spacing members separating the flanges of said elements, a supporting device, elements bearing against a plurality of the first mentioned elements and against said device, means to fasten said elements, spacing members and device to a wheel, strut means extending from said device, cushioning means for the tread carried by said strut means intermediate the second mentioned elements, and means to reinforce the tread at the grooves.

8. A vehicle tire having a tread, cushioning means therefor, means carried by said tread to impart the pressure to the said cushioning means, second cushioning means, said tread having means to force said second cushioning means outwardly upon movement of the means carried by the tread, and means to prevent undue spreading of the tread at the portion engaged by the second mentioned means.

9. A resilient tire including a plurality of opposed nested half tubular annular members secured in spaced relation to the sides of a wheel felly, the free edges of such members lying within the tread zone of the tire, and spacing means acting to space such free edges relative to each other to prevent rattling of said members due to shocks received during travel.

10. A resilient tire including a plurality of nested annular concave members secured in opposing relation on either side of the wheel felly and spaced from each other, said members varying in transverse extent whereby a succession of cushioning springs are formed to progressively absorb shocks imparted to the outermost members.

11. A resilient tire including resilient concentrically arranged half tubular annular members formed from sheet metal, spacing means inserted between said annular members and securing the inner edges to the opposite sides of a wheel felly, the free edges of said members lying within the tread zone of the tire to receive and compensate for shocks received during travel, and resilient means spacing the said annular members apart from each other at the free edges to prevent rattling.

12. A resilient tire including a plurality of nested annular concave members secured in opposing relation on either side of a wheel felly, and resilient means spacing the free edges of said members from each other and acting as an intermediary to transmit shocks received on the outermost member to the succeeding members whereby such shocks are progressively absorbed by the resiliency of such members.

In testimony whereof I affix my signature in presence of two witnesses.

FRANK S. WEISE.

Witnesses:
M. E. JONES,
E. M. BROOKS.